J. L. EVERMAN.
INTERNAL COMBUSTION ENGINE.
APPLICATION FILED MAR. 21, 1917.
1,290,948.
Patented Jan. 14, 1919.
2 SHEETS—SHEET 2.
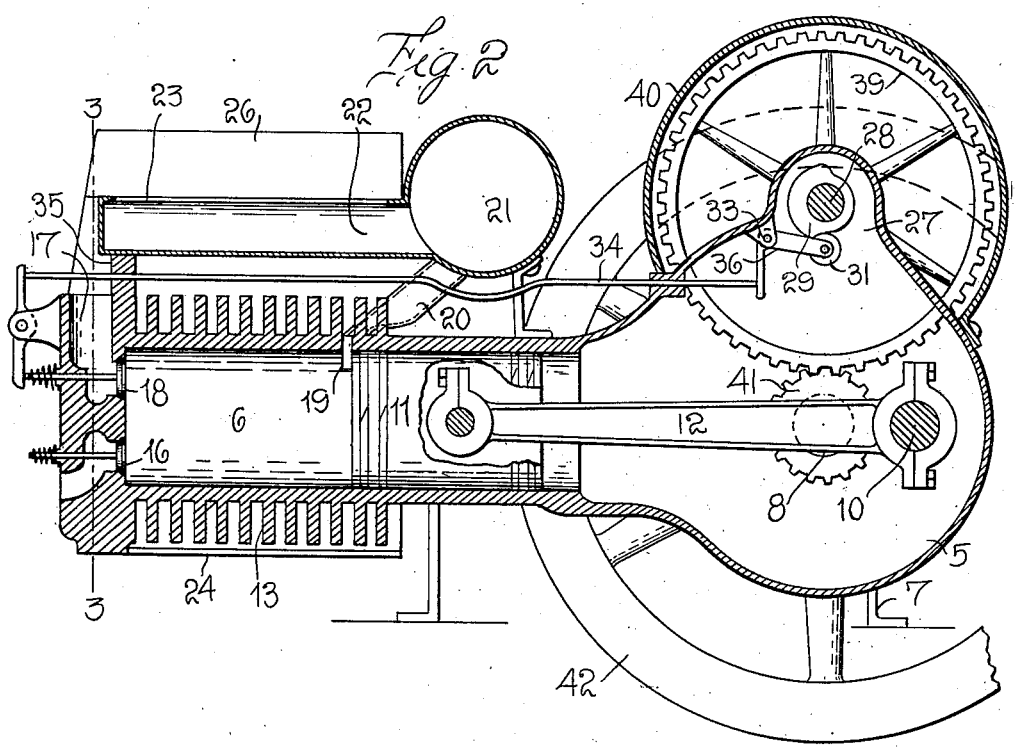
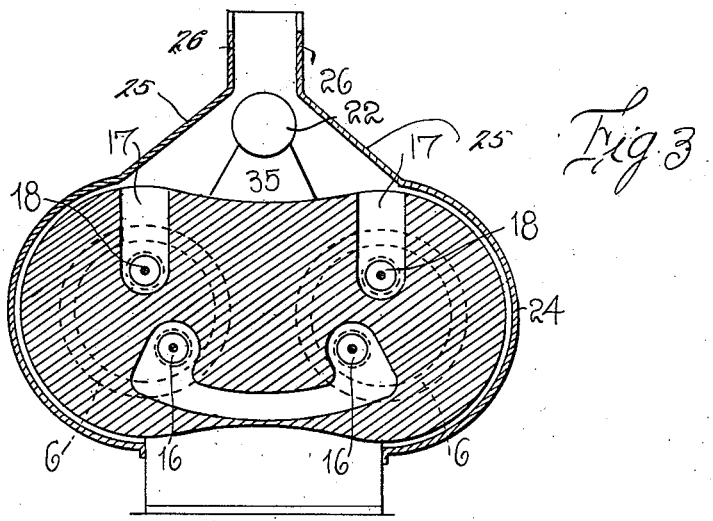
Inventor
JOHN L. EVERMAN
By Watson E. Coleman
Attorney

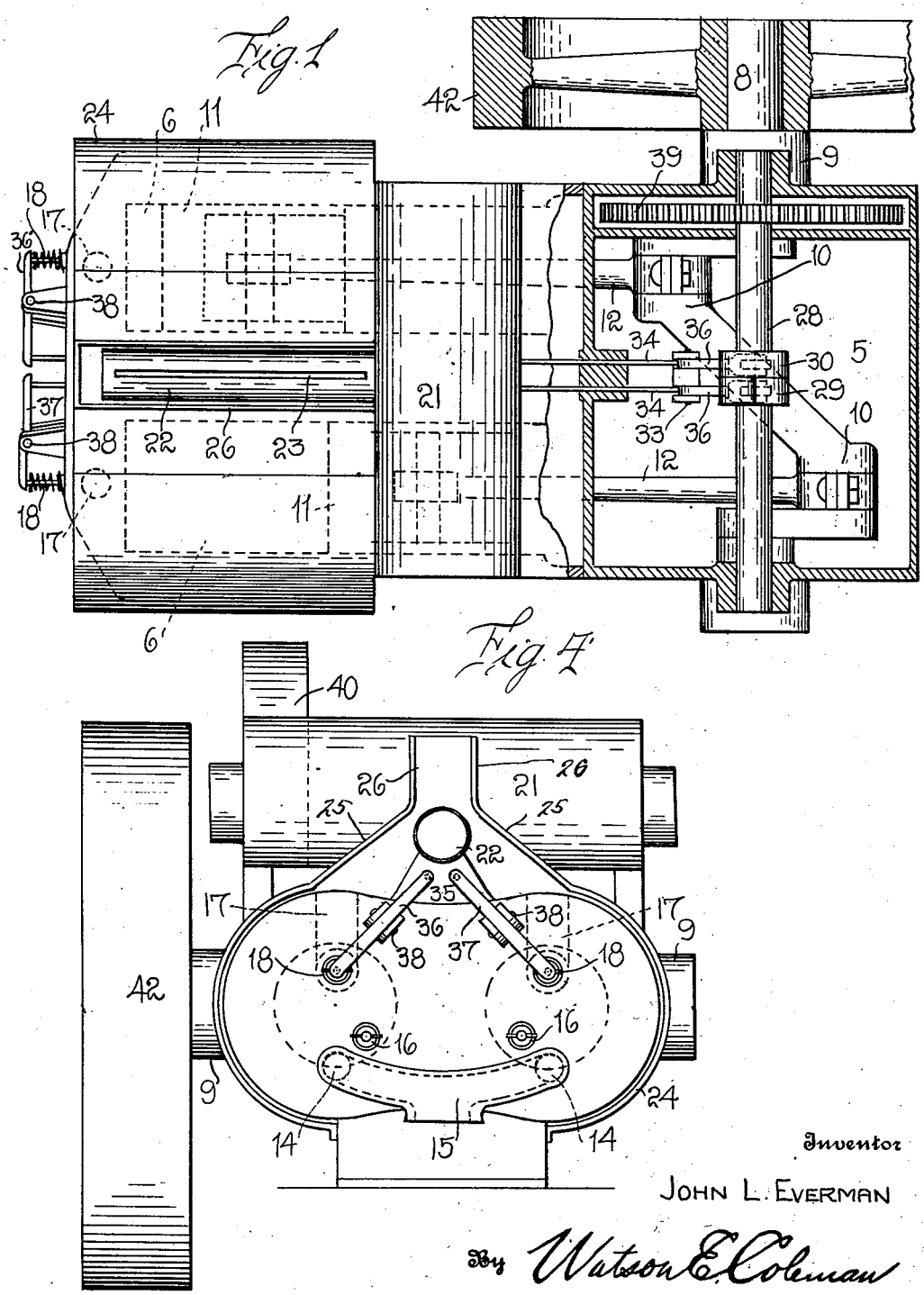

UNITED STATES PATENT OFFICE.

JOHN L. EVERMAN, OF GRUNDY CENTER, IOWA.

INTERNAL-COMBUSTION ENGINE.

1,290,948.   Specification of Letters Patent.   Patented Jan. 14, 1919.

Application filed March 21, 1917. Serial No. 156,432.

*To all whom it may concern:*

Be it known that I, JOHN L. EVERMAN, a citizen of the United States, residing at Grundy Center, in the county of Grundy and State of Iowa, have invented certain new and useful Improvements in Internal-Combustion Engines, of which the following is a specification, reference being had to the accompanying drawings.

It is the primary object of the invention to provide means whereby the exhaust of the burned gases creates a forced draft of atmospheric air around the engine cylinders, whereby the latter are cooled.

It is a further object of the invention to provide a very compact arrangement of the several parts in an engine of the type above referred to, whereby the same are rendered positive and reliable in their action, not liable to get out of order, and whereby the manufacturing cost of the engine is reduced to a minimum.

With the above and other objects in view, my invention consists in the novel features of construction, combination, and arrangement of parts to be hereinafter more fully described, claimed, and illustrated in the accompanying drawings, in which, Figure 1 is a plan view illustrating the preferred embodiment of the invention, the crank case being shown in section;

Fig. 2 is a vertical longitudinal section through one of the engine cylinders and the crank case;

Fig. 3 is a section taken on the line 3—3 of Fig. 2; and

Fig. 4 is an end elevation.

Referring in detail to the drawings wherein I have illustrated a two-cylinder engine, 5 designates the crank case and 6 the engine cylinders which are supported by a suitable base or frame bed 7. While I have shown the engine cylinders horizontally arranged, it is, of course, manifest that the engine may be vertically disposed. The power shaft 8 of the engine is journaled in suitable bearings 9 provided in the opposite side walls of the crank case, and said shaft has the usual spaced cranks 10 operating within the case 5.

A piston 11 reciprocates in each of the cylinders 6 and is connected by the rod 12 to one of the cranks 10. Each of the cylinders 6 is provided with spaced, circumferential vanes or ribs 13 upon its periphery, affording annular air passages whereby the cylinder wall may be cooled. The outer end wall or head of each cylinder 6 is formed with a gas intake port 14 leading to a common manifold 15, to which any preferred type of carbureter may be connected. Communication between these intake ports and the respective cylinders is normally closed by spring-held valves 16. 17 designates a fresh air intake port communicating with each engine cylinder, said ports being likewise normally closed by the spring-held valves 18. At the inner end of each cylinder 6, an exhaust port 19 is provided in the wall thereof, and these ports communicate through the passages or conduits 20 with a drum or muffler 21. This muffler is provided with a pipe or extension 22 extending at right angles to the longitudinal axis of the muffler and in parallel relation to the engine cylinders, and said pipe is provided with a longitudinal slot 23 through which the exhaust gases are finally discharged to the atmosphere.

A sheet metal wall or jacket 24 surrounds the outer side of each of the engine cylinders in spaced, concentric relation to the vanes or ribs 13 thereon, said wall having a section 25 converging toward the exhaust pipe 22 and being then extended in spaced, parallel relation to a corresponding portion of the other wall 24, as at 26.

The crank case 5 is formed with an extension or enlargement 27 in which a cam shaft 28 is rotatably mounted. Upon this shaft, cams 29 and 30 are fixed. Each of these cams coacts with a roller 31, each roller being mounted in one arm of a bell crank lever 36 which is fulcrumed, as at 33, upon the wall of the crank case extension. The other arm of the bell crank lever contacts with a rod 34 slidably mounted in the wall of the crank case and in a suitable guide 35 on one of the engine cylinders. The other ends of the rods 34 are adapted to engage the levers 36' and 37 respectively, which are fulcrumed intermediate of their ends upon the heads of the respective engine cylinders, as at 38. These levers at their other ends engage the stems of the respective air inlet valves 18 of the engine cylinders, whereby the latter are actuated and opened at the proper time in each cycle of operation to admit fresh atmospheric air to the cylinders.

A large gear wheel 39 is fixed upon the cam shaft 28, a suitable housing 40 being provided for this gear wheel and secured to the crank case of the engine. The gear wheel 39 meshes with a relatively small wheel 41 which is fixed upon the power shaft 8 of the engine. The usual fly wheel 42 is also secured upon the engine shaft exteriorly of the crank case.

Having fully described the several structural parts of my improved engine, its operation will be understood as follows. Assuming that a charge of explosive mixture has been admitted through the port 14 to one of the engine cylinders and ignition has taken place, when the piston 11 reaches the end of its power stroke the port 19 is uncovered and the major portion of the gases rush through this port into the muffler 21. These gases being exhausted to the atmosphere through the slot 23 under relatively high pressure, cause a forced draft of air around and between the sheet metal wall 24 and the wall of the adjacent engine cylinder. This cool air circulating between the vanes or ribs 13 on the cylinder wall effectively cools the latter. Immediately after the exhaust port is thus opened, the valve 18 of the engine cylinder is opened by the co-action of one of the cams with one of the rollers 31, whereby movement is transmitted to the sliding rod 34 and the lever 36 actuated to force the valve 18 inwardly against the expansive action of its spring. This valve is held in such open position by the cam during one and one-half revolutions of the crank shaft, and during the first half revolution the cylinder 11 moves outwardly and drives out the burned gases through the port 17 which did not escape through the port 19. In the next half revolution or during the inward movement of the piston 11, fresh atmospheric air is drawn into the cylinder through the port 17, which materially aids in cooling the cylinder walls and also in scavenging the engine cylinders of the remaining burned gas. In the next half revolution and the following outward movement of the piston 11, the air which was taken into the cylinder is driven out or exhausted through the port 17. The valve 18 is now released and returns to its seat, thereby closing the port 17 so that in the next inward stroke of the piston, a fresh charge of the explosive mixture is drawn in through the port 14, the valve 16 being opened by suction. This mixture is compressed when the piston again moves outwardly in the cylinder. Ignition now again takes place and the cycle just described is repeated.

From the above, it will be appreciated that by allowing the high pressure gases to escape from the cylinder immediately upon the completion of the power stroke, the cooling of the cylinder by the creation of an air draft around its wall is materially aided. Also, the high pressure gases which usually make considerable noise, are effectively muffled without creating a back pressure which would heat the engine cylinder. Also, by the provision of the exhaust nozzle or pipe 22 whereby the forced draft of cooled air around the engine cylinder is created without causing a back pressure against the piston, loss of power and the necessity of using fans or other cooling apparatus which consumes power and easily gets out of order, is obviated. Again, by drawing cool atmospheric air directly into the engine cylinder in each cycle of operation, a thorough scavenging action is obtained so that the cylinder is effectively freed of all of the burned gases of the previous charge. This action occurs regularly after each power stroke and not intermittently or irregularly as is the case in some types of four-cycle engines.

From the foregoing description, taken in connection with the accompanying drawings, the construction, manner of operation, and several advantages of my invention will be clearly and fully understood. It will be seen that I have produced a very simple and effective engine construction whereby overheating of the engine cylinders and pre-ignition of the gaseous charge is absolutely precluded. This desirable result is obtained in a very simple and compact arrangement of the several elements, and without the consumption of any part of the working energy of the engine. Therefore, my invention is not only economical in its construction, but the expense incident to its operation is also reduced to a minimum.

While I have herein shown and described the preferred form, construction, and relative arrangement of the several parts employed, it is to be understood that the same are susceptible of considerable modification and I, therefore, reserve the privilege of adopting all such legitimate changes as may be fairly embodied within the spirit and scope of the invention as claimed.

Having thus fully described my invention, what I desire to claim and secure by Letters Patent is:—

1. In a gas engine, a pair of engine cylinders each having a relief port adapted to be uncovered by the piston at the end of its working stroke to exhaust the burned gas from the cylinder in combination with a jacket wall consisting of two sections extending in opposite directions around the respective cylinders and having convergently disposed portions and parallel portions extending from the contiguous ends of said converging portions and an exhaust pipe connected to said ports and extending in parallel relation to the cylinders said pipe having a continuous longitudinal slot in its wall through which the exhaust gas is ejected between the parallel portions of the jacket wall sections.

2. In a gas engine, a pair of engine cylinders each having a relief port adapted to be uncovered by the piston at the end of its working stroke to exhaust the burned gas from the cylinder, in combination with a jacket wall consisting of two sections extending in opposite directions around the respective cylinders and having convergently disposed portions and parallel portions extending from the contiguous ends of said converging portions, a drum connected to the ports of the engine cylinders, and receiving the exhaust gases therefrom, said drum having an extension pipe disposed at right angles to the axis of the drum and in parallel relation to the engine cylinders, said pipe having a continuous longitudinal slot in its wall located between the adjacent ends of the converging portions of the jacket wall to discharge the exhaust gases directly between the parallel portions of said wall.

In testimony whereof I hereunto affix my signature in the presence of two witnesses.

JOHN L. EVERMAN.

Witnesses:
L. B. DE SEELHORST,
FLORENCE DE SEELHORST.